Feb. 9, 1943. M. J. WEBER ET AL 2,310,560
WEIGHING SCALE
Filed Aug. 30, 1938 3 Sheets-Sheet 2
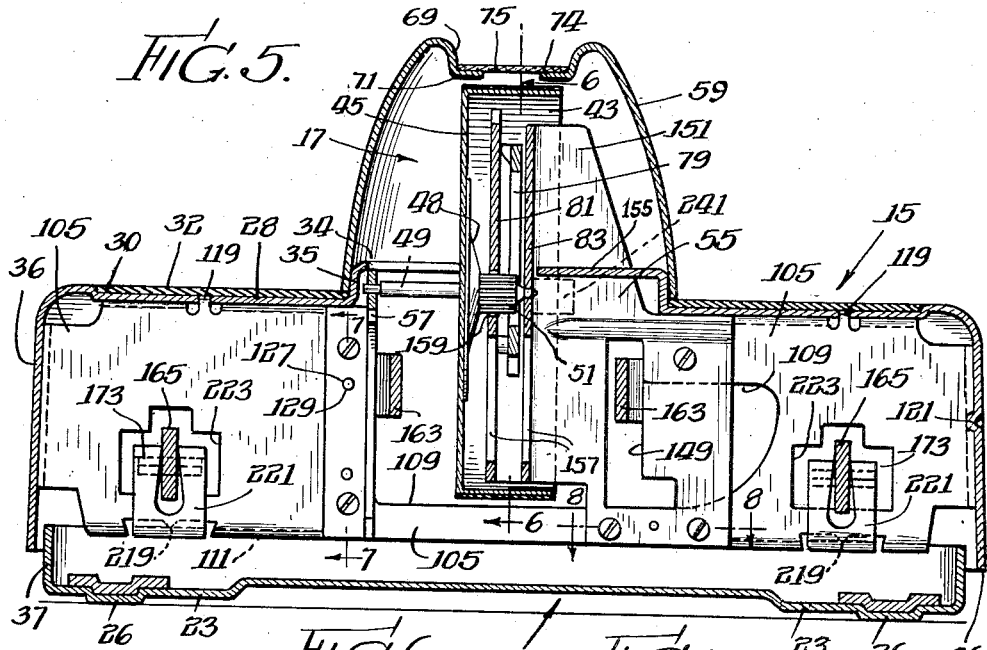
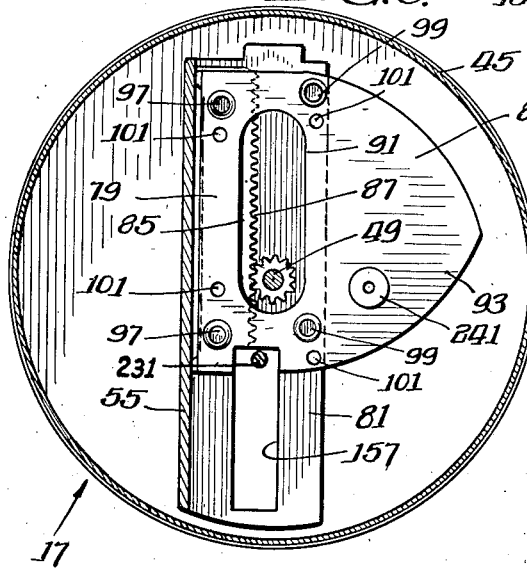
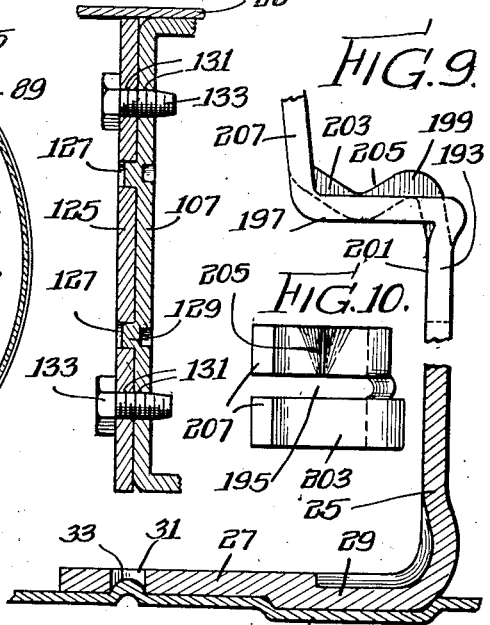
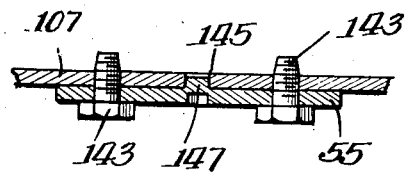
INVENTORS.
Mathias J. Weber
Russell E. Vanderhoff
By: Cox & Moore ATTORNEYS.

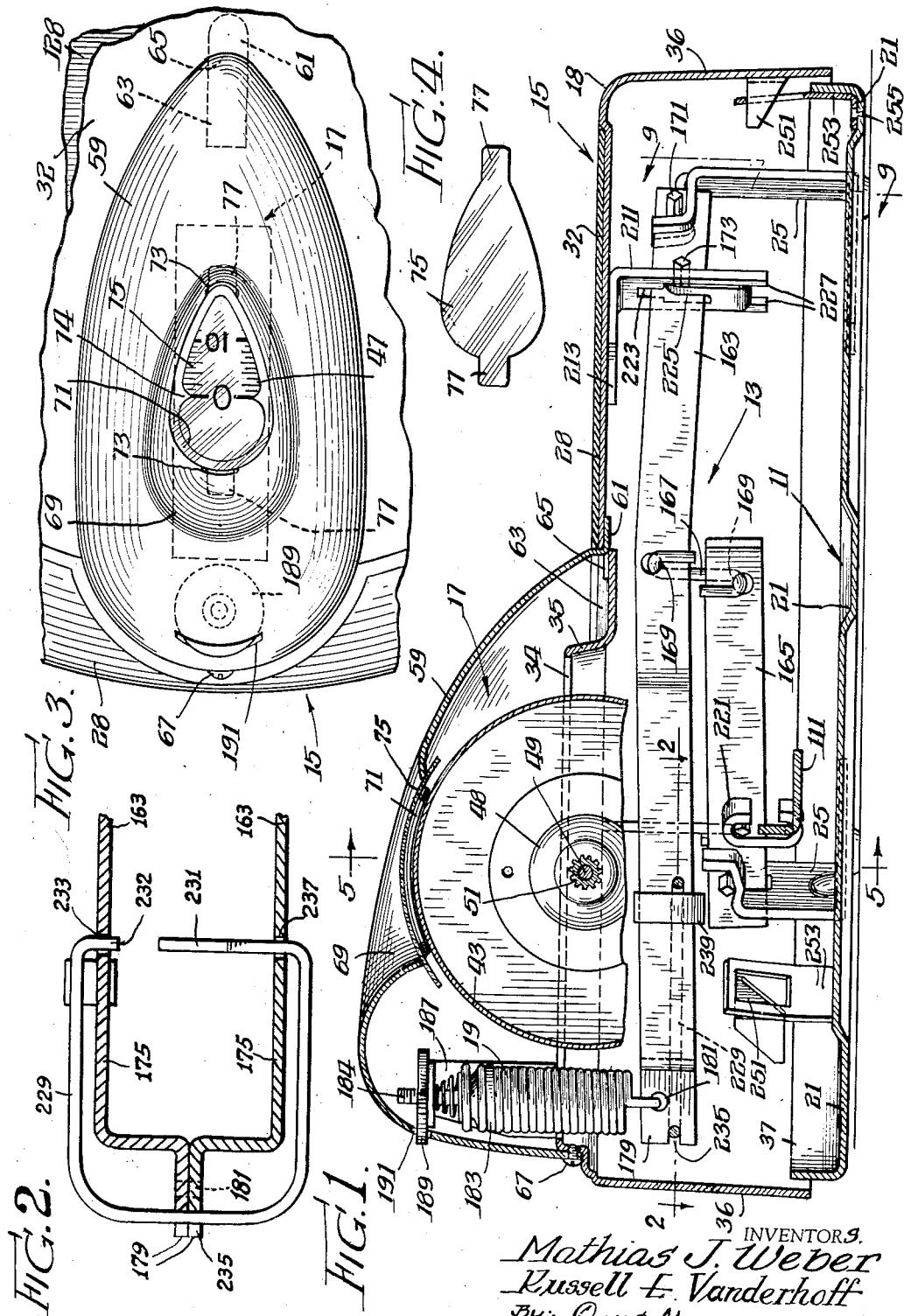

Feb. 9, 1943. M. J. WEBER ET AL 2,310,560
WEIGHING SCALE
Filed Aug. 30, 1938 3 Sheets-Sheet 3
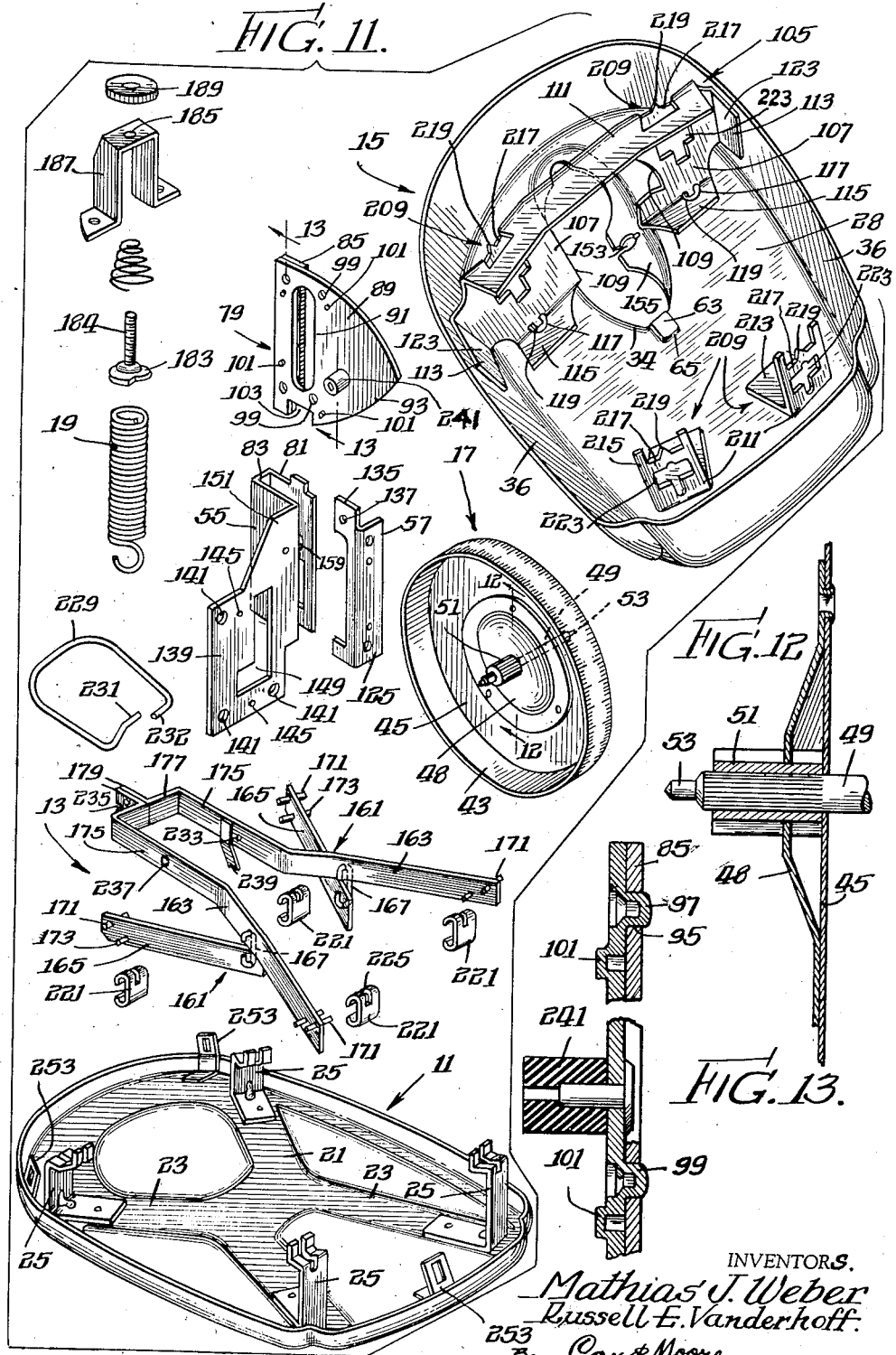
INVENTORS.
Mathias J. Weber
Russell E. Vanderhoff.
By Cox & Moore ATTORNEYS.

UNITED STATES PATENT OFFICE 2,310,560

WEIGHING SCALE

Mathias J. Weber and Russell E. Vanderhoff, Chicago, Ill., assignors to Continental Scale Corporation, Chicago, Ill., a corporation of Delaware Application August 30, 1938, Serial No. 227,493

36 Claims. (Cl. 265—68)

The present invention relates in general to weighing scales, and has more particular reference to a scale having a weight-carrying platform relatively close to the floor and adapted for use as a personal weighing scale.

An important object of the present invention is to provide a scale of the character mentioned having high space efficiency as a result of the novel and compact arrangement of its parts, and of inexpensive construction, providing, withal, unusual accuracy in weight measurement through several novel expedients and refinements; and a further object of the invention is to provide structural improvements whereby the manufacturing cost of the scale is substantially reduced without sacrificing accuracy or efficiency.

Another important object is to provide a weighing scale comprising a plurality of levers suspended on resilient weighing means, the levers being supported on a suitable base and carrying a platform for receiving the weight to be measured, the levers being also connected with an indicator wherein at least a pair of the levers are separately connected upon the resilient weighing element; a further object being to provide means for equalizing the force transferred through the several levers to the resilient weighing element.

Another important object resides in forming the levers of metal straps; a further object being to provide the levers with knife edges comprising prismatic pieces force-fitted into openings, accurately died in the levers whereby precisely spaced knife edges are provided on the levers at minimum expense; a still further object being to produce said prismatic pieces by severing sections from a stock rod.

Another important object is to arrange the levers as a pair of cooperating lever sets, each set comprising elongated lever elements, the corresponding elements of each set being of identical form for economic fabrication of the parts.

Another important object resides in providing self-aligning bearings on the scale base, in which the knife edge elements of the levers are supported, said bearings each comprising a bifurcated portion defining a slot for receiving a lever with arms on opposite sides of the slot affording bearings for the prismatic knife edge pieces, one of said bearings comprising a flat plate on one side of the slot, and on the other side of the slot forming a notch which is relatively sharply defined adjacent the slot and widens away from said slot whereby the knife edge piece may be shifted in the bearing to permit alignment of the lever.

Another important object is to form the bearings as sheet metal stampings; a further object being to align the bearing elements or pedestals upon the base by providing the elements and the base during the formation thereof with cooperating dowel projections and dowel openings.

Another important object is to provide a weighing scale, including weighing mechanism and a cooperatively associated indicator actuated by the mechanism, and a weighing platform comprising an integral one-piece shell providing a housing for the weighing mechanism; a further object being to form the shell as a sheet metal stamping.

Another important object is to form the platform as a drawn sheet metal shell of relatively thin sheet metal stock, and providing within the shell a sheet metal brace bar extending between the opposed lateral sides of the shell and interconnecting said sides with each other and with the shell portions forming the platform whereby to brace and rigidify the shell and eliminate weighing errors due to platform deflection; a further object being to utilize said bracing means to suspend the platform on the weighing mechanism.

Another important object is to form the brace bar as a sheet metal stamping, and to provide for positioning the same accurately on the shell by forming the bar with integral dowels, and providing dowel openings in the platform shell during the formation of the same, whereby the bar may be assembled on the shell with said integral dowels in the dowel openings to accurately locate the bar on the shell.

Another important object is to provide for suspending the platform shell on the levers forming the weighing mechanism by means of hangers comprising sheet metal loops; a further object being to slot each of the loops at one end for the reception of the lever element, and to provide curled fingers adapted to extend on each side of the lever in position to hang upon the opposed ends of a prismatic knife edge piece on said lever; a still further object being to utilize the other end of the loop hangers as stirrups for supporting feet means on the platform.

Another important object is to form some of the platform feet in the brace bar, and to provide additional feet on the platform remote from the brace bar in position to be received by the suspension stirrups afforded by the loop hangers.

Another important object is to provide the platform feet each with a toothed portion or projection, whereby the stirrups may rock upon said feet for purposes of self-alignment.

Another important object is to form the platform feet as sheet metal stampings, and to locate the same on the platform shell by means of cooperating dowel projections and corresponding dowel openings on the shell and in the sheet metal foot elements.

Another important object resides in suspending the levers comprising the weighing mechanism upon a resilient weighing element carried by the platform shell; a further object being to utilize a helical spring as the resilient weighing element, and to connect the spring at one end to the lever system and at the other end to a spring mounted on the platform shell.

Another object is to secure the spring upon a headed stem forming threaded engagement with an adjusting nut seated on a bracket on the platform element, whereby to adjust the resilient weighing element; a further object being to utilize a conical spring between said weighing element to prevent the adjusting stem from rattling in its mount while permitting mechanism adjustment through the ability of the conical spring to collapse all of its coils in a single plane.

Another important object is to mount the indicator upon the platform element; a further object being to support the indicator on the brace bar which is utilized not only to rigidify the platform shell, but also as a means for suspending the platform on the lever system.

Another important object is to mount the indicator in brackets secured to the brace bar, and to provide for accurately positioning the brackets on the bar by forming the same and the bar as sheet metal stampings provided with cooperating dowel projections and dowel-receiving openings formed on the parts by dies during the stamping operation.

Another important object is to brace and align at least one of the indicator brackets upon the platform shell by forming said shell with a notch for receiving a projecting portion of the indicator bracket.

Another important object is to form the indicator as a rotatable dial having cylindrical scale-carrying portions; a further object being to form the dial with an axle carrying a driving pinion thereon within the confines of said cylindrical scale carrying portions.

Another object is to form at least one of the indicator brackets with a portion extending within said cylindrical scale-carrying portion of the indicator; a further object being to arrange said bracket portions within the cylindrical scale-carrying indicator portion as a pair of spaced apart plate portions defining a guideway, and to mount the indicator shaft with said pinion extending within said guideway.

Another object is to provide a preferably gravity-actuated rack in said guideway and supported by the spaced plate portions of the indicator bracket in position to drivingly engage the indicator pinion.

Another important object is to provide equalizing means adapted to impart to the indicator movement corresponding to the mean or average movement of the several levers, whereby to compensate for unequal movement of corresponding levers of the lever sets as may be caused by eccentric application of a weight to be measured on the platform; a further object being to form the equalizing means as a member loosely fastened on the levers and serving to hold the same together so that the levers may rock relatively to the member, the member having a portion extending between the levers and drivingly associated with the indicator for the purpose mentioned; and a still further object is to form the equalizing means as a piece of wire on and interconnecting the ends of a pair of the levers and having an end extending inwardly of one lever and through registering notches formed in the spaced plates defining the rack guideway, whereby said end underlies the rack and may impart upward movement to said rack in said guideway against the force of gravity when said levers move in unison, said equalizing wire supporting the rack element substantially midway between the levers.

Another important object resides in forming the dial axle by cutting a piece of suitable length from a stock bar and finishing the opposed ends to provide pintles for reception in bearing openings in the dial support brackets, fitting a pinion upon the stem, and finally assembling the stem and the pinion on the dial with the teeth of said pinion interlocking in an opening having serrated or toothed edges in a plate forming a part of said dial.

Another important object is to form the pinion driving gravity-actuated rack as a weighted plate having an elongated slot to slidingly receive the indicator driving pinion, and a rack element secured to the weighted plate with its teeth extending at an edge of said slot in position to engage the rack; a further object being to provide the weighted plate and the rack on the opposite sides thereof with rack aligning projections adapted to slidingly engage the opposed faces of the bracket portions forming the rack guideway; and a still further object is to utilize the rack aligning projections on one side of the plate to secure the rack and said weighted plate together.

Another important object is to provide the rack element with a stop thereon in position to engage an abutment carried by the platform, and preferably on one of the indicator supporting brackets, for stopping the upward movement of the rack when the weighing scale returns to and beyond zero indication upon removal of a weight from the platform, the rack stop being in position to force the rack snugly into the pinion so that the entire rack tooth may be effective in absorbing the shock of stopping the rotation of the dial; and a further object is to provide a resilient bumper, preferably on the rack stop, effective between the stop and the abutment, to eliminate noise of contact which, if produced within the shell-like platform, is magnified by the tendency of the shell to reverberate.

Another important object is to arrange the rotatable indicator element in an opening formed in the platform shell at one end thereof in position with the indicator extending in said opening partially above and partially below the plane of the weight-carrying platform, and to form said platform with a rib or rim at said opening; a further object being to provide a separate cover element demountably secured on the platform shell at the indicator opening for the purpose of enclosing the portions of the indicator extending above the platform through said opening.

Another important object is to mount the resilient weighing element in said opening with its upper end extending the plane of the platform, and to form the indicator cover with a slot through which the spring tension adjusting disk may extend for manipulation outwardly of the cover.

Another important object is to provide the cover with an opening opposite the uppermost portions of the scale-carrying surfaces of the indicator element, and to utilize a flexible window-pane member for covering said opening while exposing the indicator to view; a further object being to form the flexible window-pane element with a pair of lugs adapted to extend in slots formed in the cover, whereby to hold the window-pane element in flexed position upon a curved seat defining the window opening whereby the resilience of the pane element serves to retain itself in place.

Another important object resides in forming the cover element with a lug or tongue in position to slidingly engage a slot in the platform shell whereby to retain the cover in place, including additional means for fastening a remote portion of the cover upon the platform shell to retain said tongue in the slot.

These and numerous other important objects and advantages and inherent functions of the invention will become apparent as the same is more fully understood from the following description, which, taken in connection with the accompanying drawings, discloses a preferred embodiment of the invention.

Referring to the drawings:

Figure 1 is a sectional view taken longitudinally of a weighing scale embodying the present invention;

Figure 2 is a sectional view taken substantially along the line 2—2 in Figure 1;

Figure 3 is a top plan view of the indicator portion of the scale;

Figure 4 is a plan view of a window-pane element forming a part of the indicator cover;

Figure 5 is a sectional view taken substantially along the line 5—5 in Figure 1;

Figures 6, 7, and 8 are sectional views taken, respectively, substantially along the lines 6—6, 7—7, and 8—8 in Figure 5;

Figure 9 is a sectional view taken substantially along the line 9—9 of Figure 1;

Figure 10 is a top plan view of the bearing pedestal illustrated in Figure 9;

Figure 11 is an exploded view illustrating the several parts of the scale in perspective;

Figure 12 is a sectional view taken substantially along the line 12—12 in Figure 11; and Figure 13 is a sectional view taken substantially along the line 13—13 in Figure 11.

To illustrate the invention, the drawings show a weighing scale of the relatively low platform type adapted for use as a personal weight scale and comprising means forming a base 11, on which is mounted weighing mechanism comprising a lever system 13, a weighing platform 15 carried by the lever system and comprising a shell-like element forming a housing for the weighing mechanism, and weight indicating means 17 drivingly connected with the lever system and which is adapted to indicate, in terms of movement of the lever system, the weight of an object disposed on the platform. The weighing mechanism also comprises counterbalancing means, preferably a helical spring 19 upon which the lever system is suspended, the spring 19 preferably being anchored on the platform element 15 at one end and being formed for connection at its other end with the lever system so that the weight on the platform may be shown by the indicator 17 in terms of spring deflection.

When a weight is applied on the weighing platform 15, the lever system 13 is depressed on the base against the contrary resistance of the counterbalancing means 19, the extent of the displacement of the lever system being proportional to the amount of the weight being measured. The indicated actuating connection serves to shift the indicating means 17 in response to the movement of the lever system. The indicating means preferably comprises a member rotatably mounted on the platform element and provided with a driving pinion 49, the indicating actuator means preferably comprising gravity-actuated rack means drivingly associated with the pinion 49 and normally urged downwardly by gravity so as to ride upon and be supported by a portion of the lever system, so that when the lever system is depressed on the base under the influence of a weight to be measured on the platform, the rack means will follow the lever system downwardly and rotate the pinion 49 and its connected indicator element through an angular distance proportional to the displacement of the lever system. There is no positive connection between the rack means and the lever system, but the rack merely rests or rides upon a rack engaging element carried by the lever system.

The base 11 preferably comprises a sheet metal sheet deformed as at 21 for rigidifying the plate, the deformation comprising arm-like channels 23 meeting at and extending from the central portions of the plate to the corners thereof and forming seats for receiving bearing pedestals 25 on which the lever system 13 is mounted. The depressions 23 are preferably formed with downwardly facing pockets 26 forming feet for the weighing scale. The pedestals 25 preferably comprise sheet metal strips, each having a portion 27 deformed as at 29 to fit into the pockets 26 and to be attached on the base 11 in any suitable or convenient fashion, as by spot welding. In order to accurately locate the pedestals 25 on the base, the pedestal portions 27 are preferably each formed with an opening 31 which may be applied as a die punching during the formation of the pedestal, and the base 11 is formed with upward projections 33 accurately located and formed therein as a die pressing operation during the formation of the plate 11. Thus, by assembling the pedestals 25 each with its opening 31 receiving a projection 33 on the base plate, and the pedestal deformation 29 extending in the formed pocket 26, all of the bearing pedestals may be accurately located on the base speedily and spot welded in place.

The platform and mechanism housing element 15 preferably comprises a drawn sheet metal shell having platform portions 28 adapted to receive the feet of a person to be weighed, the portions 28 preferably being provided with a depressed seat 30 for receiving a tread layer 32, such as a piece of linoleum or rubber composition or similar sheet material, which may be glued or otherwise secured in the seat 30 to provide an attractively finished surface having preferably non-skid characteristics. The shell comprising the platform element 15 is preferably provided with an opening 34 centrally of and at the toe end of the platform portion 28, said opening 34 being preferably defined by an upstanding flange 35 formed in the sheet metal shell. At the marginal edges of the platform portion 28 the shell preferably has a depending flange forming a skirt 36, the lower edge of said flange 36 overlapping and co-operating with an upstanding peripheral flange 37 formed on the base plate 11, as shown clearly in Figures 1 and 5 of the drawings.

The indicator 17 comprises an element having cylindrical scale carrying portions 43 carried on a disk 45, the edges of which are secured to the cylindrical wall portions 43, at one end thereof, whereby the portions 43 and 45 form a shallow cylindrical cup. The outer surfaces of the wall portions 43 serve to carry weight scale graduations 47 and the indicator element is supported on and journaled for rotation with respect to the platform element 15 in position extending in the opening 34 so that a portion of the indicator extends above the platform. The end portion 45 of the indicator element has a dished mounting 48 secured on the wall 45 in position extending within the cylindrical wall 43. The indicator element is carried on a shaft 49 which extends through a central opening in the disk 45 and through an opening in the dished element 48. The shaft 49 also carries press fitted thereon a pinion 51, the teeth of which are splined to the dished element 48, the opening of which is formed to mesh with said pinion teeth. The pinion 51 is merely press fitted upon the shaft 49 and into the dented opening in the element 48 and is held in place merely by the frictional engagement of said press fitting. The opposite ends of the shaft 49 are turned down and preferably hardened to provide pintles 53 of relatively small diametral dimension, and these pintles are preferably journaled in spaced brackets 55 and 57 which are mounted on the platform element 15. It will be seen that the rotatable indicator and its driving gear 51 need not necessarily be fixed on the shaft but may rotate thereon since the splined relationship between the pinion 51 and the indicator through the dented plate 48 affords the driving connection between the pinion, which is drivingly connected with the weighing mechanism as hereinafter described, and the indicator shaft merely serves as a support axis about which the indicator rotates.

The platform preferably carries an indicator cover 59, the same preferably comprising a formed sheet metal shell having edges adapted to enclose the upstanding flange 35 which defines the indicator opening 34. This shell preferably has a projecting tongue or finger 61 at one end at an edge thereof, which finger is shaped to enter a depression 63 formed in the platform shell 15 adjacent the flange 35. The shell is formed with an opening 65 at the edge of the depression 63 opposite from the flange 35 in position such that the tongue 61, after being positioned in the depression 63, may be moved forwardly through the opening 65 into position interlocking beneath the platform portion 28. In such position the edge of the cover 59 opposite from the tongue 61 engages the flange 35 at a point remote from the depression 63 and means, preferably a set screw 67, may be used at such remote point to secure the cover upon the element 15 so that the cover may be dismounted merely by removing the screw 67 and sliding the same to retract the tongue 61 from the slot 65.

The cover 59 also is formed with a depression 69, the bottom of which is curved to conform with the curvature of the indicator portions 43, and said curved bottom of the depression 69 is provided with an opening defined by a marginal flange 71. The material of the cover 59 in the depression 69 is formed with slots 73 at the opposite ends of the opening, and transparent window-pane means 75 is provided for closing said opening in a manner excluding dust and other foreign matter while revealing the scale surface of the indicator portion 43 to view through said opening. The window-pane means 75 preferably comprises a plate of flexible, transparent material which may conveniently be shaped as shown in Figure 4, having medial portions configurated to fit upon the curved seat afforded by the flange 71, and having tongues 77 at the opposite ends of the pane element in position to extend in the slot 73 whereby the resilience of the flexible pane element serves to hold itself snugly upon the seat afforded by the flange 71. The flange 71 also may be formed with registering projections on opposite sides of the opening to form index means 74.

The rotatable indicator element 17 may be driven by the weighing levers in any suitable or preferred fashion, but it is preferably driven by means of a rack element 79, which is mounted and guided for sliding movement in a channel preferably defined by spaced portions 81 and 83 of the bracket 55. The rack element 79 preferably comprises a rack piece 85, the same preferably being a flat piece of hardened sheet metal formed with rack teeth 87, and a mounting plate 89 on which the rack piece is attached. The rack piece is mounted preferably along an edge of the mounting plate which has an elongated opening 91 formed therein so that the rack teeth 87 project into said opening along an edge thereof. Beyond said opening the mounting plate is formed with a nose 93 to provide an overbalanced weight to normally urge the rack teeth into engagement with the pinion 51, as will hereinafter be more fully discussed.

As shown more particularly in Figure 13 of the drawings, the rack piece 85 is formed with perforations 95, and the plate 89 is formed with struck-out portions 97 in position to extend through the perforations 95, said portions 97 being pressed in said openings to form a rivet-like connection securing the rack piece on the mounting plate. It will be noted that the portions 97 project outwardly of the surface of the rack piece in position to slidingly engage the bracket portion 81. The mounting plate 89 is provided also with a plurality of struck-out portions 99 forming means adapted to bear upon the portion 81 of the bracket. The mounting plate also has struck-out portions 101 extending on the side thereof opposite from the portions 97 and 99, which said portions 101 are adapted to slidingly engage the bracket portion 83, whereby said portions 97, 99, and 101 serve to maintain the rack means 79 in an upright position and prevent wobbling thereof in the guideway defined by said rack portions 81 and 83. The projections 97, 99 and 101 serve to minimize the friction between the plate and the rack and to keep the track clean from rust, that may otherwise accumulate, causing the rack to stick in the guideway and fail of its own gravity to follow the driving element down when a weight is on the platform. It will be noted, however, that these guiding means may be inexpensively formed as a simple stamping operation during the formation of the plate 89, while the riveting of the rack piece on the mounting plate likewise is accomplished extremely inexpensively.

The rack plate 93 opposite an end of the opening 91 and at an end of the rack piece is formed with a notch 103 for a purpose hereinafter more fully described.

The brackets 55 and 57 are preferably mounted upon means 105 forming a combined bracing and rigidifying strut for the platform shell 15 and platform supporting feet whereby the weight of the platform is applied upon the lever system. This strut 105 preferably comprises a sheet metal element which may conveniently be formed as a stamping consisting of a web 107 extending between the opposite side flanges 36 of the shell 15 approximately at the middle of the opening 34. Opposite the opening 34 the web 107 is cut away, as at 109, to form a space for receiving the indicator 17.

The stamping comprising the strut 105, as shown in Figures 5 and 11, has a flange 111 along its lower edge, wing flanges 113 at its opposite ends in position to be secured, as by spot welding, to the dependent portions 36 of the shell 15, and also has flange means 115 at the upper edges of the web 107 in position to be secured, as by spot welding or otherwise, to the underside of the platform portion 28. The flanges 115 and the adjacent portions of the web 107 preferably are cut away, as at 117, to provide upstanding tongues 119 at the upper edge of the web 107. These tongues are adapted to engage in corresponding perforations formed in the platform portion 28 and serve as dowels for aligning and positioning the bracing member 105 in the frame in order to accurately locate the same in position to be secured in place, as by welding the flanges 113 and 115 to the shell 15. In addition, the dependent portions 36 of the platform shell may be formed with dimples 121 in position to fit in openings 123 accurately positioned in the flanges 113 for the purpose of aiding in the alignment of the bracing member within the shell 15 prior to the welding operation.

The indicator mounting bracket 57 preferably comprises a mounting portion 125 having perforations 127 accurately located therein in position to receive projecting nubs 129 formed on the web 107, and aligned perforations 131 are formed in the bracket portion 125 and in the web 107 for the reception of fastening members 133 so that the co-operation of the nubs 129 in the openings 127 may accurately align the bracket 57 on the bracing bar 105. The bracket 57 also comprises an offset portion 135 formed with an opening 137 adapted to receive the pintle 53 on one end of the indicator carrying shaft 49. The bracket 55 likewise is formed with a mounting portion 139 comprising a plate having openings 141 for the reception of fastening elements 143 similar to the elements 133 for securing the plate on the bracing bar 105. The bracket portion 139 also has perforations 145 similar to the perforations 127 for receiving nubs 147 on the web 107 whereby to accurately align and position the bracket 55 on the brace bar. The plate portion 139 has an elongated opening 149 for receiving one of the levers of the lever system and permitting the same to extend therethrough and move freely therein without binding upon the bracket. The plate portion 139 has an upstanding flange 151 which projects preferably in a slot 153 formed in an inwardly bent flange 155 on the shell 15 at the opening 34 in order to brace the bracket 151 upon the shell 15. The bracket has bent and rebent portions forming the spaced portions 81 and 83 which form the guideway in which the rack element 79 rides. These spaced portions 81 and 83 are formed with elongated openings 157 for a purpose hereinafter more fully described, and the portion 81 has a circular opening 159 opposite the upper end of the slot 157, the opening 159 being of a size to freely receive the pinion 51. The other bracket portion 83 is provided with a small bearing opening axially aligned with the opening 159 for the reception of the pintle 53 at the end of the axle 49 adjacent the pinion 51.

It will be seen from an inspection of Figure 5 of the drawings that the indicator is mounted on the brackets 55 and 57 with the pinion 51 extending in the opening 159 so that the scale carrying portions 43 of the indicator enclose the rack portions 81 and 83, and the pinion 51 extends through the slot 91 of the rack element 79 in position with its teeth engaging the teeth of the rack piece. It will be noted that the rack piece engages the pinion substantially in line with the central plane of the scale carrying portions 43 of the indicator, and that the arrangement of the indicator in position surrounding the bracket portions 81 and 83 and the rack element guided therein is extremely compact.

The lever system 13 comprises a pair of lever sets 161, each of which includes a main lever element 163 and an auxiliary lever 165. The levers 163 and 165 are preferably formed from strips of sheet metal, the main levers extending from the opposite corners of the scale in the heel portions thereof to a common point in the toe portions of the scale, said levers passing on opposite sides of the indicator element 17. The auxiliary levers 165 extend from opposite sides of the scale in the toe portions thereof to the mid portions of the levers 163, at which point each auxiliary lever is connected with its co-operating lever 163 by means of an open link 167.

The links 167 are preferably formed of steel wire, the opposite ends of which are looped and the loops relatively twisted to form an open link. The levers are formed with openings for receiving the loops, said openings being accurately positioned in the levers and forming notches 169 for receiving the loops.

The ends of the levers 163 and 165 are provided with knife edge elements which preferably comprise short lengths of hardened prismatic bearing material, the elements preferably having square shape and being press fitted into openings of corresponding shape accurately formed in the levers so that the knife edge elements provide aligned bearing edges on opposite sides of the levers. Each lever has a knife edge element 171 at the end of the lever and near the upper edge thereof. Each lever also has a knife edge element 173 spaced inwardly of the end thereof and preferably located near the lower edge thereof, the elements 171 being adapted to form pivotal engagement on the pedestals 25 while the elements 173 afford means for supporting the platform on the lever system.

The bearing pedestals 25, as shown in Figures 9 and 10, have portions 193 extending above the portions 27, the upper ends of the portions 193 being slotted, as at 195, to form spaced apart bearing portions 197 and 199 and an intermediate notch 201 to freely receive the lever. The bearing portion 197 is bent from the portion 193 substantially at right angles to provide a horizontal, substantially flat bearing surface 203 on one side of the slot 195. The bearing portion 199 is formed to provide a notched bearing surface 205 on the other side of the slot 195, the notch, as shown clearly in Figure 10, being relatively sharp and well defined adjacent the slot 195 and becoming wider and less distinct toward the side of the portion 199 remote from the slot 195. The ends of both portions 197 and 199 may, if desired, be bent upwardly as at 207 to complete the bearing. The lever is assembled on the pedestal with the strip portion thereof extending in the notch 201 and the knife edge element 171 resting at one end in the notch 205 and at the other on the flat bearing surface 203.

The platform, as shown in Figure 11, is provided with suspension means 209 for supporting the same on the lever system, a plurality of said suspension means comprising integral portions of the bracing bar 105 and others comprising separate brackets 211 attached directly on the underside of the platform 28 of the shell 15. The brackets 211 each comprise a mounting portion 213 preferably formed with perforations positioned and adapted to receive corresponding dowel-like projections on the underside of the platform portion 28 in order to accurately align the same in a fashion similar to the manner used in aligning the bearing pedestals 25 on the base 11 and upstanding portions 215. The suspension means 209 as formed in the separate brackets 211 and in the brace bar 105, comprise bars 217 formed in the brace bar and in the brackets 211, by stamping out suitable portions of the brackets and the brace bar, said bars 217 being preferably formed each with a central projection 219 and serving as a rocking support for stirrups 221. The brace bar and the brackets 211 are also formed with cut-outs 223 affording free passage therethrough of the ends of the levers, as clearly indicated in Figure 1.

The stirrups 221 preferably comprise each a strip of sheet metal having the opposite ends thereof curled, and one curled end being slotted, as at 225, to provide a pair of spaced curled fingers and to receive the ends of the lever between said fingers with the fingers curled about and hanging on the opposed ends of the knife edge elements 173 on opposite sides of the lever. The lower curled end of the stirrups 221 forms a saddle for receiving the lower edges of the bars 217 which, because of the medial point 219 therein, may be rockingly and self-alignedly supported in the stirrup. The brace bar 105 and the brackets 211 are provided with abutting shoulders 227 at the opposite ends of the bars 217 in order to retain the stirrups in position to receive the points 219 at their approximate mid points substantially vertically beneath the levers.

The levers 163 between the knife edge elements and the links 167 are inclined inwardly of the sides of the weighing scale, and the levers 165 likewise incline inwardly from the bearing supports 25 toward the points of linked connection with the levers 163. The levers 163 have portions 175 which extend substantially parallel and on opposite sides of the indicator, and the lever members are bent inwardly, as at 177, behind the indicator and have adjacent portions 179 extending side by side but not rigidly secured together. These portions 179 are each formed with an aligned perforation 181 through which is hooked the lower end of the spring 19. The upper end of the spring 19 is threaded upon the head 193 of a support member having a threaded shank 184 which is slidingly assembled in an opening 185 formed in a bracket 187 mounted on the shell 15 within the cover 59. An adjusting nut 189 has threaded engagement with the stem 184 above the bracket 187, the nut thus being supported in position so that its edge may extend outwardly through a slot 191 in the cover 59, as shown clearly in Figure 1 of the drawings. By turning the nut 189 the spring 19 may be raised or lowered on the platform element in order to adjust the normal unloaded position of the levers and of the indicator that is connected thereto to a desired position, as for example, in setting the indicator to zero scale reading opposite the index means 74.

The levers 163 are drivingly connected with the rack in any suitable fashion, preferably by means of an equalizing member 229, shown in Figure 11, which member has a portion 231 carried by the levers in position extending in the notch 103 immediately beneath the rack teeth, as shown in Figure 6, whereby the rack is moved by a force applied in line with the meshing rack and pinion teeth. The equalizer member 229 is carried on the levers 163 in such a manner that the effect of any lateral wobble in the levers is not transmitted to the rack. To this end, as shown more particularly in Figure 2 of the drawings, the member 229 preferably comprises a length of wire, one end 232 of which is anchored in a perforation 233 in one of the levers 163, extending thence to the end of the levers, with the mid portions of the wire seating in a pair of aligned slots 235 in the lever portions 179, the other lever carrying the rack engaging portion 231 extending through a perforation 237 therein, and thence inwardly through the slots 157 in the bracket 55 in position to rest beneath and support the rack member 79 by engaging the slotted portion 103 thereof. If the levers 163 for any reason are subjected to a lateral rocking movement, as for example, when a weight being measured is unevenly distributed on one side of the platform, the rocking of the levers will cause the member 229 to correspondingly rock in the seats afforded by the notches 235 and the perforations 233 and 237 to thereby maintain the rack carrying portion 231 at an elevation that is not altered as the result of the lateral rocking movement of the levers. To insure the retention of the portion 232 of the compensating member 229 in the perforation 233, I may provide a holding flap 239 comprising a sheet metal piece welded or otherwise suitably secured to the lever adjacent the opening 233 and adapted to be wrapped around the end of the wire after it has been assembled.

When a weight is applied on the platform for measurement, the shell 15 will depress the levers against the tension of the suspension spring 19. The extension of the spring and consequent movement of the levers is proportional to the amount of weight applied on the platform. As the levers are thus depressed, the member 231 is lowered beneath the rack member which, because of its weight, will follow the movement of the portion 231 and thereby turn the indicator by an amount proportional to the weight being measured, the amount of turning movement being indicated in terms of weight by the graduated scale 47 in conjunction with the index means 74.

It will be noted that the nose portion 93 of the rack member provides a counterweight tending to rotate the rack member in the direction of said nose about the rack actuating element 231. Consequently, the rack piece 85 is consistently urged by gravity action into tight engagement with the pinion, thereby avoiding back lash and consequent indicator errors. It will be noted that the rack driving element 231, being a resilient wire, is adapted to provide for shock absorption thereby protecting the indicator parts from damage through rough usage of the scale. The rack element 79 also may be provided with a bumper comprising a cylindrical, preferably rubber buffer 241 mounted on a pin fastened preferably in the nose portion 93 in position to engage the flange 155 on the platform element in the event that the indicator over-runs in returning to its normal position when the scale is unloaded, as often occurs when a heavy weight is suddenly removed from the scale, as a result of the action of the spring 19 upon the lever system. It will be noted that the buffer 241 is in a position such that when it engages the flange 155, as indicated in dotted lines in Figure 5, the interaction of the buffer with said flange will cause the rack member to rotate slightly in a direction causing the rack and pinion gears to tightly mesh so that the same may be effective from tip to base in absorbing the shock of stopping the rotation of the indicator. In addition, this non-metallic resilient means, such as the buffer 241, deadens the sound incident to the recoil or rising movement of the floating rack as, for instance, when a load is suddenly removed from the platform. Without the utilization of this sound deadening means the noise occasioned by the swift rise of the rack in such circumstances would be transmitted to the platform shell, which would tend to act like a sound board and magnify this noise considerably. By the utilization of the non-metallic yielding, sound-deadening means the scale is rendered relatively quiet in such operation.

It will be seen that the levers are connected upon the platform and may be raised with the platform from the base; however, in order to hold the base loosely on the platform element and thus retain the bearings 25 in assembled relationship with the lever system, the base 11 is provided with a plurality of latch keepers 253 preferably comprising sheet metal plate portions forming loops secured preferably at the edges of the hose adjacent the rim 37 in any suitable fashion as by welding. Said latch keepers have portions, as indicated at 255, co-operating with corresponding dowel-like elements on the base in order to facilitate accurate positioning of the same thereon prior to welding. The latch keepers are in position to co-operate with tongues 251 appropriately positioned on the skirt portion 36 of the platform, so that by merely pressing the platform and levers downwardly upon the base, the latch members 251 and 253 snap into holding relationship to maintain the parts together upon the lever system. The latches may be opened to allow disassembly of the scale by inserting a tool, such as a screw driver, between the edge of the base 21 and the overlying edge of the platform skirt 36, and by operating the tool as a lever to bend the latch members 253 inwardly to free them from the tongues 251.

It will be noted that all of the parts of the weighing mechanism may be formed as simple products of a punch press, thereby rendering the scale extremely inexpensive to manufacture. The simplification of assembly afforded by the interfitting dowel-like projections and projection receiving openings in the various parts, whereby the same may be aligned exactly in a desired position, will be apparent and appreciated by anyone familiar with the difficulties of rapidly and expeditiously assembling the parts of precise weighing mechanism. In addition, the improvements in the inexpensive manufacture of bearings, including the self-aligning features of the bearing pedestals 25, the rocking and self-aligning features of the platform feet 209, in combination with the stirrups 221, impart extreme accuracy in the scale of the present invention, the parts being susceptible of manufacture at low cost and by mass production methods.

It is thought that the invention and its numerous attendant advantages will be fully understood from the foregoing description, and it is obvious that numerous changes may be made in the form, construction and arrangement of the several parts without departing from the spirit or scope of the invention or sacrificing its attendant advantages, the form herein described being a preferred embodiment for the purpose of illustrating the invention.

The invention is hereby claimed as follows:

1. A weighing scale comprising a base, weighing mechanism supported on said base and comprising a system of levers fulcrumed on said base, a weight receiving platform supported by said levers, counterbalancing means on which said system of levers is yieldingly suspended, and an indicator, said indicator comprising a cylindrical rim forming a scale carrying member and means for mounting said rim for rotation about its axis, including a pinion enclosed within said rim, rack means engaging the pinion within said rim, said system of levers comprising a pair of lever members extending on opposite sides of said indicator, and indicator driving means rockingly connected on both of said lever members and having a portion extending within said rim in position drivingly engaging said rack means substantially midway between said lever members.

2. A weighing scale comprising a base, weighing mechanism supported on said base and comprising counterbalancing means and a pair of independent levers suspended on the counterbalancing means and fulcrumed on said base, a weight receiving platform supported by said levers, an indicator, an indicator actuating member longitudinally movable in a plane substantially midway between said levers, and a member rockingly connected on both of said levers and having a portion extending therebetween in position drivingly engaging said indicator actuating member substantially midway between said levers.

3. A weighing scale comprising a base, weighing mechanism supported on said base and comprising counterbalancing means and a pair of independent levers suspended on the counterbalancing means and fulcrumed on said base, a weight receiving platform supported by said levers, an indicator, an indicator actuating member comprising a gravity actuated rack longitudinally movable in a plane substantially midway between said levers, and a member rockingly connected on both of said levers and having a portion extending therebetween in position beneath said rack to drivingly engage the same substantially midway between said levers.

4. A weighing scale comprising a base, weighing mechanism supported on said base and comprising a system of levers fulcrumed on said base, a weight-receiving platform carried by said levers, said platform comprising a shell of formed sheet material, a rigidifying bridge rigidly secured on and within said shell, bearing means on said bridge for supporting the platform on said levers, counterbalancing means on which said system of levers is yieldingly suspended, an indicator comprising a rotatable element supported on said bridge, and means for rotating said element in response to movement of said weighing mechanism.

5. A weighing scale comprising a base, weighing mechanism supported on said base and comprising a system of levers fulcrumed on said base, counterbalancing means on which said system of levers is yieldingly suspended, and a weight receiving platform supported by said levers, said platform comprising a shell of formed sheet material, a rigidifying bridge rigidly secured on and within said shell, bearing means on said bridge for supporting the platform on said levers, and an indicator comprising a rotatable element journaled in bearing means on said bridge.

6. A weighing scale comprising a base, weighing mechanism supported on said base and comprising a system of levers fulcrumed on said base, counterbalancing means on which said system of levers is yieldingly suspended, and a weight receiving platform supported by said levers, said platform comprising a shell of formed sheet material, a rigidifying bridge rigidly secured on and within said shell, bearing means on said bridge for supporting the platform, an indicator comprising a rotatable element carrying a pinion, bearing means on said bridge for said rotatable element, said bearing means comprising bracket means secured on said bridge in position forming a rackway, a rack movable in said rackway in position to drivingly engage said pinion, and means for moving said rack in said rackway in response to movement of said weighing mechanism.

7. A weighing scale comprising a base, weighing mechanism supported on said base and comprising a system of levers fulcrumed on said base, a weight receiving platform supported by said levers, said platform comprising a shell of formed sheet material and a rigidifying bridge rigidly secured on and within said shell, bearing means on said bridge for supporting the platform on said levers, counterbalancing means on which said system of levers is yieldingly suspended, and an indicator, said indicator comprising a rotatable element carried on a shaft, bearing means supporting spaced portions of said shaft on said bridge, said bearing means comprising brackets secured on mountings formed on said bridge, said brackets and mountings and said bridge and shell being of die formed material and having cooperating die formed dowel-like projections on one and openings in the other for accurately aligning the parts during assembly.

8. A weighing scale comprising a base, weighing mechanism supported on said base and comprising a system of levers fulcrumed on said base, a weight-receiving platform carried by said levers, counterbalancing means on which said system of levers is yieldingly suspended, said platform comprising a drawn shell member of sheet material having an integral platform portion and a dependent marginal skirt, platform bracing means comprising a bridge forming a partition extending between and secured to portions of said skirt on opposite sides of the scale and on the under side of said platform portion, said bridge being formed with an opening through which a lever of said system extends, said lever having a knife edge at said opening and said bridge having a bearing edge adjacent said opening, and means swingably connecting said bridge and said lever and rockingly engaging the bearing edge of the bridge and the knife edge of said lever.

9. A weighing scale comprising a base, weighing mechanism supported on said base and comprising a system of levers fulcrumed on said base, a weight receiving platform carried by said levers, counterbalancing means on which said system of levers is yieldingly suspended, and an indicator, said platform comprising a drawn shell member of sheet material having an integral platform portion and a dependent marginal skirt, platform bracing means comprising a bridge forming a partition extending between and secured to portions of said skirt on opposite sides of the scale and on the under side of said platform portion, said indicator being rotatably supported on said bridge and drivingly connected with said lever system, said bridge being formed with openings through which the levers of said system extend.

10. A weighing scale comprising a base, weighing mechanism supported on said base and comprising a weight-receiving platform and counterbalancing means on which said platform is yieldingly suspended, a rotatable indicator having a pinion drivingly connected therewith, rack means driven by said weighing mechanism and drivingly engaging said pinion, said rack means comprising a support plate having struck-out portions on opposite sides thereof and a rack piece formed with teeth in an edge thereof and perforated to receive certain of said struck-out portions on one side of said plate, and a rack guide in which said rack means is slidingly mounted, said struck-out portions having bearing means for slidingly engaging the rack guide to maintain the rack means in alignment while substantially eliminating friction.

11. A weighing scale comprising a base, weighing mechanism supported on said base and comprising a weight receiving platform and counterbalancing means on which said platform is yieldingly suspended, a rotatable indicator having a pinion drivingly connected therewith, rack means drivingly engaging said pinion, said rack means comprising a rack plate formed with an elongated slot adapted to receive said pinion, means forming rack teeth at one edge of said slot, and means driven by the weighing mechanism and forming a driving connection with said rack plate.

12. A weighing scale comprising a base, weighing mechanism supported on said base and comprising a weight-receiving platform and counterbalancing means on which said platform is yieldingly suspended, a rotatable indicator having a pinion, formed with pinion teeth and drivingly connected with said indicator, rack means drivingly engaging said pinion, said rack means comprising a rack member formed with rack teeth, bearing means on said platform for said rotatable indicator, said bearing means comprising bracket means forming a rackway supporting said rack member and actuating means driven by the weighing mechanism and having driving engagement with said rack member substantially in alignment with said rack teeth, said rack member having substantial weight in position with respect to its point of driving engagement with said actuating means to normally urge the rack member in a direction snugly to mesh the rack and pinion teeth.

13. A weighing scale comprising a base, weighing mechanism supported on said base and comprising a weight receiving platform and counterbalancing means on which said platform is yieldingly suspended, a rotatable indicator having a pinion, formed with pinion teeth and drivingly connected with said indicator, rack means drivingly engaging said pinion, said rack means comprising a rack plate formed with an elongated slot adapted to receive said pinion, means forming rack teeth at one edge of said slot, means driven by the weighing mechanism and forming driving connection with said rack plate beneath and substantially in alignment with said rack teeth, said rack plate having substantial weight on the side of the slot remote from said rack teeth to normally urge the plate by gravity action in a direction to snugly mesh the rack and pinion teeth.

14. A weighing scale comprising a base, weighing mechanism supported on said base and comprising a weight receiving platform structure and counterbalancing means on which said platform structure is yieldingly suspended, a rotatable indicator having a pinion drivingly connected therewith, rack means drivingly engaging said pinion, said rack means comprising a rack structure formed with rack teeth, means driven by the weighing mechanism and having driving engagement with said rack structure substantially in alignment with said rack teeth, and cooperating means on said rack and platform structures comprising a stop buffer on one structure in position to engage a co-operating stop on the other structure to limit the movement of the rack means in one direction.

15. A weighing scale comprising a base, weighing mechanism supported on said base and comprising a weight receiving platform and counterbalancing means on which said platform is yieldingly suspended, a rotatable indicator having a pinion, formed with pinion teeth and drivingly connected with said indicator, rack means drivingly engaging said pinion, said rack means comprising a plate structure including means forming rack teeth on said plate structure, means driven by the weighing mechanism and forming driving connection with said plate structure beneath and substantially in alignment with said rack teeth, and co-operating means on said plate and platform structures and comprising a stop buffer on one structure in position to engage a co-operating stop on the other structure if the rack means over-runs in returning the indicator to a predetermined starting position, the buffer being positioned so that, upon interengagement with said stop, the plate structure will be moved in a direction to tightly engage the rack and pinion teeth.

16. A weighing scale comprising a base, weighing mechanism supported on said base and comprising a weight receiving platform and counterbalancing means on which said platform is yieldingly suspended, a rotatable indicator having a pinion drivingly connected therewith, and rack means driven by said weighing mechanism and drivingly engaging said pinion, said rack means comprising a plate formed with rack teeth and slidingly mounted between spaced guides forming a rackway, said plate comprising a sheet metal stamping having die formed projections therein extending on opposite sides of the plate in position to snugly and slidingly engage the facing surfaces of said guides.

17. A weighing scale comprising a base, weighing mechanism supported on said base and comprising a weight-receiving platform and counterbalancing means on which said platform is yieldingly suspended, a rotatable indicator having a pinion drivingly connected therewith, and rack means driven by said weighing mechanism and drivingly engaging said pinion, said rack means comprising a plate carrying means forming rack teeth, said plate being slidingly mounted between spaced guides forming a rackway, said plate comprising a sheet metal stamping having die formed projections therein, said rack teeth being formed in a rack piece provided with perforations receiving said projections on one side of said plate, and said projections comprising rivet-like portions securing the rack piece on said plate.

18. A weighing scale comprising a base, weighing mechanism supported on said base and comprising a weight receiving platform and counterbalancing means on which said platform is yieldingly suspended, a rotatable indicator driven by said weighing mechanism and comprising an axle and a rotatable dial element having a web, means forming a plate on said web having an opening defining teeth in said plate, and means forming pinion teeth on said shaft having splined relationship with the teeth defined in said plate at said opening.

19. A weighing scale comprising a base, weighing mechanism supported on said base and comprising a lever fulcrumed on said base, a weight receiving platform supported by said lever, and counterbalancing means on which said lever is yieldingly suspended, means for mounting the platform on said lever comprising sheet metal means on and dependent from said platform, said sheet metal means being formed with a perforation to receive the lever loosely in the perforation, said perforation defining a strut forming a platform foot on said sheet metal means, and a stirrup receiving said foot and extending in said perforation, said stirrup being swingingly suspended on knife edge means on the lever.

20. A weighing scale comprising a base, weighing mechanism supported on said base and comprising a lever fulcrumed on said base, a weight receiving platform supported by said lever, counterbalancing means on which said lever is yieldingly suspended, means for mounting the platform on said levers comprising sheet metal means on and dependent from said platform and formed with a perforation to receive the lever loosely therein, said perforation defining a strut forming a platform foot in said sheet metal means, and a stirrup receiving said foot and extending in said perforation, said stirrup having a pair of fingers extending on opposite sides of said lever and swingingly suspended on knife edge means on the lever.

21. A weighing scale comprising a base, weighing mechanism supported on said base and comprising a pair of levers fulcrumed on said base, a weight receiving platform supported by said levers and counterbalancing means on which said levers are yieldingly suspended, a rigidifying bridge extending beneath and supporting said platform, said bridge being formed with spaced perforations to receive said levers loosely in the perforations, said perforations defining struts forming spaced platform feet and stirrups each receiving one of said feet and extending each in one of said perforations, each stirrup being swingingly suspended on knife edge means of a lever.

22. A weighing scale comprising a base, weighing mechanism comprising a lever fulcrumed in bearing means on said base, a weight receiving platform carried by said lever, and counterbalancing means on which said lever is yieldingly suspended, said base comprising a sheet metal shell, said bearing means comprising an upstanding member forming a pedestal having upper bifurcated portions providing a slot in the pedestal between said portions, one of said portions being formed to provide a flat bearing surface on one side of the slot and the other portion forming a grooved bearing on the opposite side of the slot, whereby the lever may extend in the slot, and knife means on and extending from the opposite sides of said lever in position resting on said flat bearing surface on one side of the lever and in said grooved bearing on the other side of the lever.

23. A weighing scale as described in claim 22 wherein said grooved bearing is relatively sharply defined adjacent the slot and is relatively flatter in the portions thereof remote from the slot.

24. A weighing scale comprising a base, weighing mechanism supported on said base and comprising a system of levers fulcrumed on said base, a weight receiving platform supported by said levers and counterbalancing means on which said system of levers is yieldingly suspended, said system of levers comprising a pair of relatively long lever arms extending between opposite ends of the scale, said arms having ends supported on the base at fulcrum points and being suspended on said counterbalancing means at a suspension point remote from the fulcrum points, and a relatively short lever for each of said arms, said short levers being each connected on a corresponding lever arm at a connection point therein intermediate the fulcrum and suspension points, with the fulcrum, suspension and connection points lying in a straight line.

25. A weighing scale comprising a base, weighing mechanism supported on said base and comprising a system of levers fulcrumed on said base, a weight receiving platform supported by said levers and counterbalancing means on which said system of levers is yieldingly suspended, said system of levers comprising a pair of relatively long lever arms having common suspension on said counterbalancing means, the remote ends of said arms extending at an angle the one with respect to the other and being fulcrumed on said base, a relatively short lever for each of said arms, said short levers being each connected on a corresponding lever arm at a connection point therein, each short lever being relatively inclined with respect to its corresponding relatively long lever arm, and a connecting member having opposite portions looped in intersecting planes for connecting each relatively short lever with its co-operating relatively long lever arm.

26. A weighing scale comprising a base, weighing mechanism supported on said base and comprising a system of levers fulcumed on said base, a weight receiving platform supported by said levers and counterbalancing means on which said system of levers is yieldingly suspended, said lever system comprising a plurality of separate levers independently fulcrumed on said base and interconnected in lever sets, each set comprising a relatively long lever extending between opposite ends of the scale and a relatively short lever extending from one end of the scale to an intermediate point of its co-operating relatively long lever, the co-operating levers of each set being relatively inclined, the one with respect to the other, and a connecting member having its opposite ends looped in intersecting planes for interconnecting said co-operating levers.

27. A weighing scale as described in claim 26 in which the looped ends of the connecting members extend in planes intersecting substantially at an angle corresponding with the relative inclination of the co-operating levers of a lever set.

28. A weighing scale comprising the combination, with weighing mechanism including a weight receiving platform and a graduated indicator facing upwardly of said platform, of cover means for said indicator comprising a sheet metal shell portion on said platform and formed with a window opening revealing said indicator therethrough, a flexible transparent windowpane element in said opening, said opening being defined by flange means forming a seat at an edge of said opening, said seat extending intermediate the opposite ends of the window opening for receiving and supporting an edge of said window-pane element, said flange means being cut away at an end of said opening to form a retaining shoulder, said window-pane element having an end forming a tongue adapted to enter and engage behind said shoulder whereby to retain one end of the pane element on the shell portion, and means for fastening said pane element on said shell portion at a point remote from said tongue to retain the pane element on said seat in position covering said opening.

29. A weighing scale comprising the combination, with weighing mechanism including a weight receiving platform and a graduated indicator facing upwardly of said platform, of cover means for said indicator comprising a sheet metal shell portion on said platform and formed with a window opening revealing said indicator therethrough, said opening being defined by flange means forming a seat along each of the opposite sides of the window opening, said seats being cut away at the ends of the window opening to form retaining shoulders, and a flexible transparent window-pane element comprising a strip of material having opposite side edges adapted for engagement on said seats and ends forming spaced tongues adapted to engage behind said retaining shoulders whereby to hold the pane element on said seat in position covering said opening.

30. A weighing scale comprising the combination, with weighing mechanism, including a weight receiving platform and a graduated indicator facing upwardly at said platform, of cover means for said indicator comprising a sheet metal shell portion on said platform and formed with a window opening revealing said indicator therethrough, said opening being defined by flange means forming a curved seat along each of the opposite sides of the window opening, one end of the window opening being formed to provide a retaining shoulder, and a flexible transparent window-pane element comprising a strip of material having opposite side edges adapted for engagement on said curved seats and an end forming a tongue adapted for engagement behind said retaining shoulder, and means to secure the other end of said pane element on said shell portion whereby to hold the pane element on said curved seat in position covering said opening.

31. A scale comprising the combination, with weighing mechanism, including a weight receiving platform and a graduated indicator facing upwardly of said platform and comprising a wheel formed with a cylindrical graduated rim, of cover means for said indicator comprising a sheet metal shell portion on said platform and formed with an elongated window opening adjacent said rim in position revealing said indicator therethrough, said opening being defined by flange means forming an upwardly curved seat along each of the opposite sides of the window opening in position adjacent to and curved in conformity with the curvature of said rim, one end of the window opening being formed to provide a retaining shoulder, a flexible transparent window-pane element comprising a strip of material having opposite side edges adapted for engagement on said curved seats and an end forming a tongue adapted to engage behind said retaining shoulder, and means to secure the other end of said pane element on said shell portion to hold the pane element in said opening and in curved position on said curved seats overlying the cylindrical rim of said wheel.

32. A weighing scale comprising a base, weighing mechanism supported on said base and comprising a weight receiving platform and counterbalancing means on which said platform is yieldingly suspended, and an indicator, said indicator having a portion extending upwardly of said platform, cover means on said platform comprising a shell formed with a window opening revealing said indicator therethrough, said shell and platform having co-operating means thereon adapted to interlock and release by relative movement of the shell and platform, and fastening means for securing the shell and platform together in interlocked condition.

33. A weighing scale comprising a base, weighing mechanism supported on said base and comprising a weight receiving platform and a spring on which said platform is suspended, means for adjustably anchoring said spring in said scale comprising a member on which said spring is secured, a mounting for said member, means operable to relatively shift said member on its mounting, and a helical anti-rattling spring operatively associated with said member and its mounting, said anti-rattling spring having coils adapted to compress in a common plane to permit maximum adjustment of said member.

34. A weighing scale comprising a base, weighing mechanism supported on said base and comprising a system of levers fulcrumed on said base, a weight receiving platform supported by said levers, counterbalancing means on which said system of levers is yieldingly suspended, and an indicator, said indicator comprising a rotatable element supported on an axle, a pinion drivingly connected with said rotatable element, rack means drivingly engaging said pinion, said rack means comprising a relatively flat block of hardened sheet metal formed on one edge with rack teeth, a mounting plate having an edge substantially flush with the edge of the block remote from the teeth, said mounting plate having a portion extending substantially beyond the teeth to provide an overbalanced weight for said rack means, said mounting plate being provided with an elongated slot therethrough in registration with the rack teeth whereby to permit the pinion to project substantially through said mounting plate, said block having a plurality of perforations formed therein, and said mounting plate having struck out portions extending into the perforations of the block whereby to accurately align said block on said mounting plate, and guide means associated with and slidingly guiding said rack means in its engagement with said pinion.

35. A weighing scale comprising a base, weighing mechanism supported on said base and comprising a system of levers fulcrumed on said base, a weight receiving platform supported by said levers, counterbalancing means on which said system of levers is yieldingly suspended, an indicator having a floating, gravity actuated operating means, said lever system comprising a plurality of separate levers interconnected in lever sets, there being a lever set disposed on each of the opposite sides of a line passing from front to rear of said base substantially centrally thereof, and each set comprising a relatively long lever extending from the front to the rear of the base and a relatively short lever extending from the rear of the scale to a point intermediate the ends of its co-operating long lever, the rear ends of said long levers having adjacently disposed terminal portions formed with registering notches, a looped resilient wire element having an end anchored in an opening adjacent the rear end of one of said long levers, an intermediate portion of the wire element lying in said registering notches, the other end of the wire element extending through an opening in the other long lever and extending horizontally between said long levers in position underlying the floating, gravity actuated indicator operating means, said counterbalancing means being connected to the terminal portions of said relatively long levers adjacent said registering notches.

36. A weighing scale comprising a base, a platform shell forming an enclosing housing with the base, a lever system in the housing, indicating means including a gravity operated floating actuator, counterbalancing means for suspending the lever system yieldingly with respect to the housing, said lever system comprising a pair of substantially similar relatively long levers extending substantially from the front to the rear of the housing and having front ends fulcrumed in spaced apart bearings at the front of the base, said relatively long levers being spaced apart substantially throughout their length and being bent toward each other to provide adjacent lever portions at their rear ends, said adjacent portions being interconnected with the counterbalancing means, a resilient wire having one end connected to one of said levers and having an intermediate portion inter-engaging with said adjacent lever portions, said wire having another portion connected to the other lever, and a free end extending between said levers to provide a resilient actuating member underlying the said gravity operated actuator, each relatively long lever having a relatively short lever pivotally connected thereto intermediate its ends, said short levers being fulcrumed in spaced bearings at the rear of the base.

MATHIAS J. WEBER.
RUSSELL E. VANDERHOFF.